Figure 1:
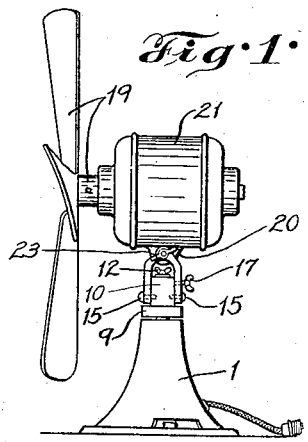

May 15, 1928.  1,670,056

D. M. WINTERS

REVOLVING FAN

Filed Aug. 15, 1927

Inventor
Douglas Mark Winters

By Adam E. Fisher.

Attorney
T.

Patented May 15, 1928.

1,670,056

UNITED STATES PATENT OFFICE.

DOUGLAS MARK WINTERS, OF MILL CREEK, ILLINOIS.

REVOLVING FAN.

Application filed August 15, 1927. Serial No. 212,874.

This invention relates to revolving fans arranged to revolve about their fixed pedestals so as to distribute air in all directions.

The object is to provide a simple, efficient and practical fan structure of this kind.

In the drawing

Figure 2:
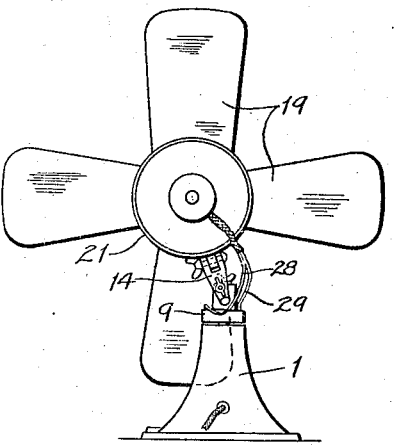
Figure 3:
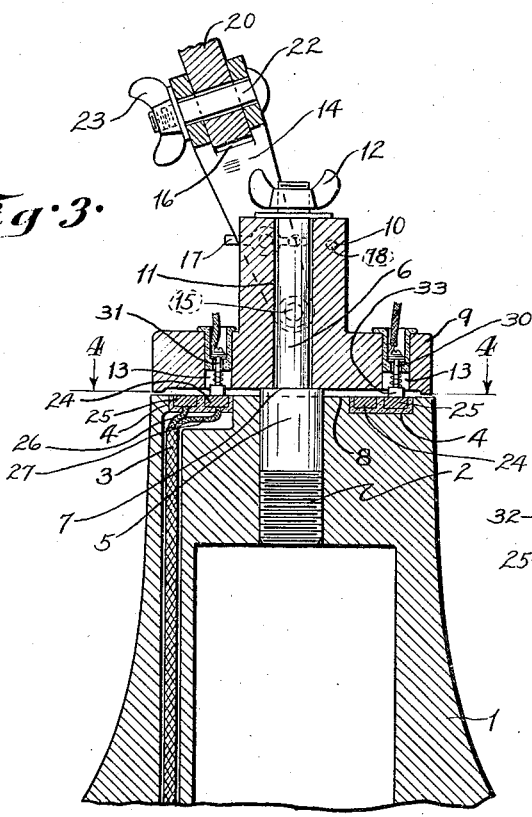
Figure 4:
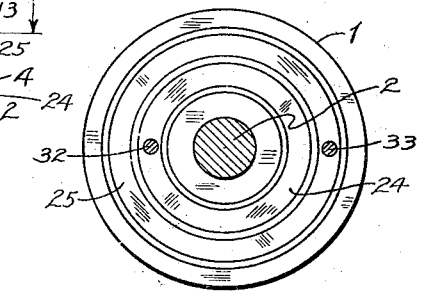

Figure 1 is a side elevation;
Figure 2 is a rear elevation;
Figure 3 is a vertical section;
Figure 4 is a plan view of the pedestal on the line 4—4 of Figure 3.

The invention comprises a pedestal 1 having a central threaded socket 2, a lateral lead duct 3 and an annular contact recess 4 formed in its upper face concentric with the socket 2. A fan post 5 having its upper end reduced to form a fan pivot 6 is threadedly seated within the socket 2 with the shoulder 7 demarking the portion 5 from the portion 6 slightly elevated above the upper face 8 of the pedestal 1 to form a bearing for the upper revolving plate 9 of the device. The plate 9 is formed with a square bearing block 10, and a bore 11 is drilled through the center of the block 10 adapted to pivotally engage the fan pivot 6, whereby the plate 9 has a bearing upon the shoulder 7 and is thus rotatively mounted upon the pivot 6. The extremity of the pivot 6 is threaded to receive the wing nut 12 whereby the plate 9 is secured in place upon the pedestal 1. The plate 9 is also pierced with two oppositely disposed terminal apertures 13. A U-shaped fan supporting link 14 straddles the bearing block 10 and is pivotally secured thereto by means of the pins 15 which pass through the stems of the link 14 and are seated in the block 10. A bearing slot 16 is formed through the body of the link 14 in the plane of the element as a whole. A wing adjustment screw 17 is passed through one stem of the link 14 and its inner end is adapted to seat within any one of a series of sockets 18 arranged in the arc of a circle upon the adjacent face of the block 10. Thus the link 14 may be swung from side to side and locked by the screw 17 in any desired position laterally of the pivot 6. The usual motor fan 19 is mounted upon the link 14 and adapted to be moved thereupon in a vertical plane by means of a flat lug 20 extended from the under side of the motor casing 21 into the slot 16 where it is adjustably locked by means of a bolt 22 passed through the link 14 and lug 20, the said bolt being provided with a wing nut 23 for frictionally locking the lug 20 at any point of its oscillation. Thus the fan may be adjusted to impel air at any desired angle relative to the horizontal. Two terminal rings 24, 25, are concentrically mounted within the recess 4 and insulated from the pedestal 1. Insulated current leads 26, 27, are passed through the duct 3 and electrically joined one each to the rings 24, 25. The insulated motor wires 28, 29, are led down into the terminal apertures 13 of the plate 9 where they are electrically joined one each to the insulated terminals 30, 31, which are mounted within the said terminal apertures 13. These terminals 30, 31, are provided with shoes 32, 33, which slide open and electrically contact with the rings 24, 25, the said shoes moving free of the walls of the apertures 13 so as to avoid danger of short circuiting. Thus the fan is rotatively mounted upon its pedestal and at all points of its rotation the motor receives its operating current through the function of the rings 24, 25, and shoes 32, 33.

In use, by adjusting the fan link 14 to a position out of alignment with the vertical axis of the pivot 6, it is evident that the back pressure of the fan in operation will cause the fan and motor to revolve in a horizontal plane upon the pedestal 1, the rate of revolution depending upon the angular displacement of the link 14 relative to the vertical axis of the pivot 6. This angular displacement and adjustment is accomplished through the adjustment screw 17, as before stated. It is thought that the stucture presented is a very simple and practical one for the purpose.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. A revolving fan, comprising a pedestal having a central pivot, a plate rotatively mounted upon the pivot, the said plate having a squared bearing block concentric with the axis of the pivot, a U-shaped fan supporting link having its stems pivotally secured to opposite parallel faces of the bearing block, the said link having a slot cut through its body portion in the plane of the element as a whole, a motor fan and casing, a flat lug extended from the under side of the motor casing into the said slot of the U-shaped fan supporting link, an adjustment bolt passed through the stems of the U-shaped fan supporting element and through the said lug, and means for locking the U-shaped fan supporting link at any degree of angular displacement relative to the said central pivot.

2. In a revolving fan structure embodying a pedestal and a fan supporting plate rotatively mounted upon the pedestal; a square bearing block upon the plate, the said block having formed in one face thereof a series of lock pin sockets arranged in arcuate formation, a fan supporting link in the form of an inverted U mounted astraddle of the said bearing block and pivotally secured thereto through its seams, and an adjustment screw passed through one of the stems and having its inner end adapted to engage the said series of lock pin sockets.

In testimony whereof I affix my signature.

DOUGLAS MARK WINTERS.